Aug. 19, 1958 R. J. BOUSEK 2,848,611

PHASE STABILIZATION OF R. F. AMPLIFIERS AND OSCILLATOR CIRCUITS

Filed July 23, 1953 2 Sheets-Sheet 1

INVENTOR.
RICHARD J. BOUSEK
BY
Marvin Moody
ATTORNEY

INVENTOR.
RICHARD J. BOUSEK
BY
[signature]
ATTORNEY

United States Patent Office 2,848,611

Patented Aug. 19, 1958

2,848,611

PHASE STABILIZATION OF R. F. AMPLIFIERS AND OSCILLATOR CIRCUITS

Richard J. Bousek, Cedar Rapids, Iowa, assignor to Collins Radio Company, Cedar Rapids, Iowa, a corporation of Iowa Application July 23, 1953, Serial No. 369,930

2 Claims. (Cl. 250—36)

This invention relates in general to means for stabilizing the phase of electronic circuits and in particular to stabilizing and controlling the phase of amplifier and oscillator circuits.

In conventional amplifier or oscillator circuits employing inductive-capacitive-resistance resonant circuits in either the grid, plate or cathode, at a given point in the circuit the relative phase angle with respect to the driving point (amplifier) or any other selected point in the circuit (oscillator), varies when the signal is slightly off the LCR resonant frequency.

It is oftentimes desirable to maintain a fixed phase relationship and the normal phase shift is therefore undesirable.

It is an object of this invention therefore to provide a phase stabilizing circuit wherein frequency deviations from resonance do not cause an undesirable phase shift.

Another object of this invention is the provision for a reflective impedance which compensates for the standard phase shifts at frequencies off resonant.

A feature of this invention is found in the provision for the addition of a dummy tuned circuit which is inductively coupled to an electronic circuit so as to obtain increased stability.

Further objects, features and advantages of this invention will become apparent from the following description and claims when read in view of the drawings, in which:

Figures 1, 2, 3:
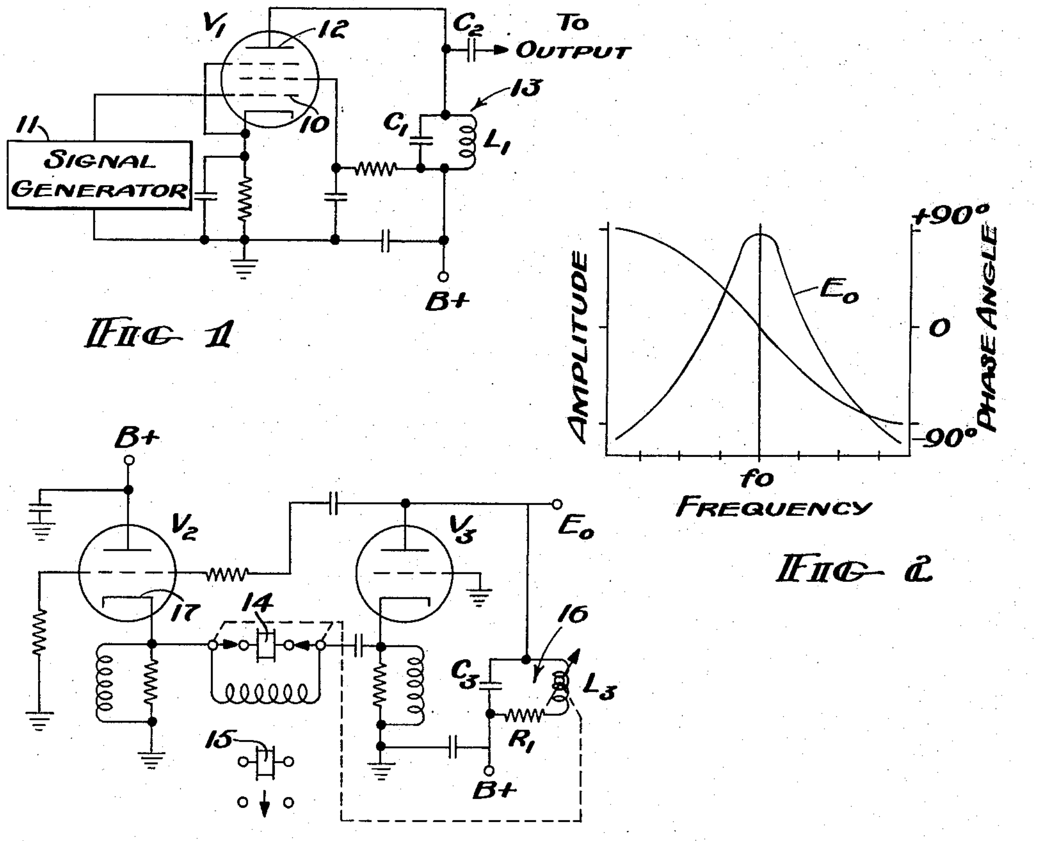
Figure 1 illustrates a conventional amplifier.
Figure 2 illustrates the standard phase angle relationship plotted against frequency, and also the voltage across the circuit plotted against frequency.
Figure 3 illustrates an oscillator circuit wherein crystals are switched.

Figure 1 illustrates a tube $V_1$ which has a control grid 10 connected to the output of a signal generator 11. The plate 12 of tube $V_1$ is connected to a tuned circuit designated generally as 13 and which comprises a condenser $C_1$ and inductance $L_1$. The output is removed from the coupling condenser $C_2$ in conventional fashion.

Figure 2 illustrates the output voltage $E_0$ plotted against frequency and it is to be noted it has a normal peak at the resonant frequency $f_0$. Also plotted on this curve is a curve of phase angle versus frequency which is at zero at $f_0$ and leads or lags at other frequencies.

Figure 3 illustrates a conventional fundamental overtone frequency oscillator circuit wherein crystals 14 and 15 may be selectively switched in the input circuit. A tube $V_3$ receives an input from the crystal and has an output RLC circuit 16 comprising a condenser $C_3$, a resistor $R_1$ and an inductance $L_3$. An amplifier tube $V_2$ has its cathode 17 connected to the crystal 14 to drive it. In such a circuit if the LCR circuit 16 is resonant at the crystal frequency, it appears resistive and produces no phase shift. However, as the resonant frequency of the circuit 16 is varied, a phase shift is introduced resulting in a change in frequency of oscillation. This is generally referred to as "pulling" the crystal.

The general phase relationship of the circuit shown in Figure 3 is similar to that shown in Figure 2.

Figure 4:
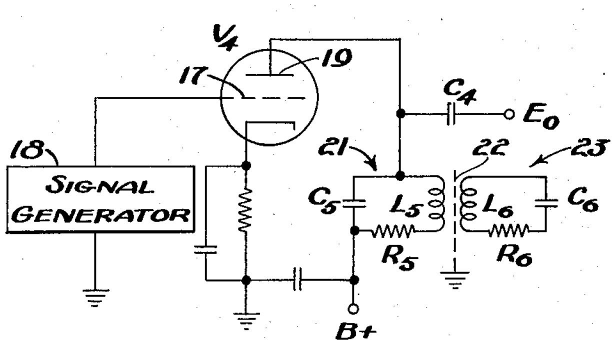
Figure 4 illustrates an amplifier according to this invention.

Apparatus according to this invention is shown in Figure 4 wherein a tube $V_4$ receives an input on its control grid 17 from a signal generator 18 and has its plate 19 connected to an ouput $E_0$ through a coupling condenser $C_4$. An RLC resonant circuit 21 comprising a condenser $C_5$, inductance $L_5$ and resistance $R_5$ is connected between the plate 19 and a suitable B plus voltage.

Mutually coupled to the inductance $L_5$ is an inductance $L_6$ which is connected in series with a condenser $C_6$ and a resistor $R_6$. A capacitive shield 22 which might be, for example, a copper plate that allows magnetic flux to pass therethrough, provides a Faraday shield. The shield is mounted between the RLC circuits 21 and 23 to prevent capacitive coupling from being reflected between them.

The circuits 21 and 23 are resonant at the same frequency and transformer theory shows that for inductive coupling there is reflected from a secondary to primary a purely resistive component. (See Terman's Radio Engineering Handbook, section 3.)

Experiments and tests carried on by the applicant have shown that for small variations in frequency the reactive component reflected from the secondary $L_6$ to the primary $L_5$ has a sign opposite to that of the primary reactance and may be made to equal, to exceed or to be smaller in magnitude than the primary reactance by adjusting the parameters Q, the coupling, and/or the LC ratio.

Variation of these factors allows the phase shift to be stabilized and controlled over a range of frequencies above and below the resonant frequency of the circuits.

Figure 5:
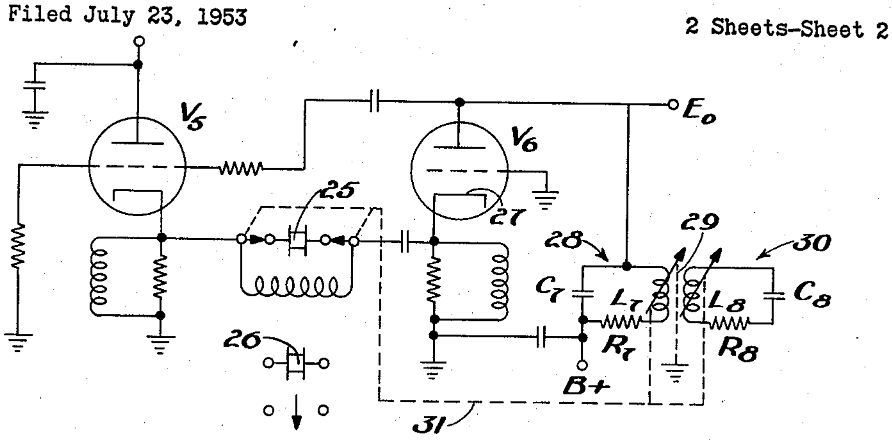
Figure 5 illustrates a crystal oscillator circuit with the apparatus of this invention.

Figure 5 illustrates a crystal controlled oscillator wherein a tube $V_5$ which is an amplifier is connected to a bank of crystals 25 and 26 that supply an input to the cathode 27 of a tube $V_6$. A resonant circuit 28 comprising a condenser $C_7$, inductance $L_7$ and resistor $R_7$ is connected in the plate circuit of tube $V_6$. A Faraday shield 29 is mounted between the inductance $L_7$ and a second inductance $L_8$ which is connected in series with a condenser $C_8$ and a resistor $R_8$. Inductors $L_7$ and $L_8$ may be varied by shaft 31 which moves them as crystals are switched.

Variation of the LC ratio, closeness of coupling, and Q in the circuits 28 and 30 allows the phase angle to be controlled.

Figure 6:
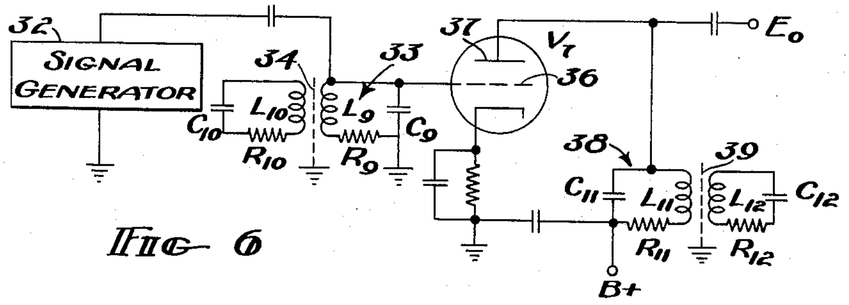
Figure 6 illustrates a double tuned circuit wherein the principles of this invention are utilized.

The circuit of Figure 6 is similar to that shown in Figure 4 except it has a tuned input and a tuned output. A signal generator 32 is coupled to a tuned input circuit 33 which comprises an inductor $L_9$, a resistor $R_9$ and a condenser $C_9$. A Faraday shield 34 is mounted between the inductor $L_9$ and an inductor $L_{10}$ which is in series with condenser $C_{10}$ and resistor $R_{10}$.

The tube $V_7$ has its control grid 36 connected to the circuit 33 and has its plate 37 connected to an output RLC circuit 38 comprising a condenser $C_{11}$, inductor $L_{11}$ and resistor $R_{11}$. A Faraday shield 39 is mounted between the inductor $L_{11}$ and an inductor $L_{12}$ which is in series with a resistor $R_{12}$ and the condenser $C_{12}$.

Figure 7:
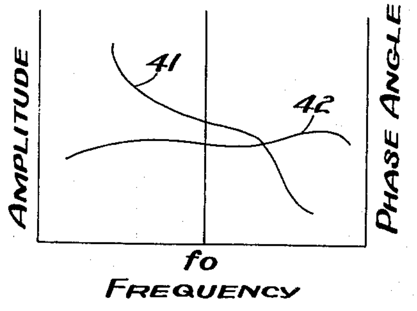
Figure 7 illustrates the phase and voltage relationships of the apparatus according to this invention plotted against frequency.

Figure 7 illustrates how the phase angle may be controlled as the frequency varies from resonance for a circuit such as shown in Figure 4. The phase angle curve is designated by the numeral 41 and the amplitude curve is designated by the numeral 42. These particular curves were plotted with a Q of 62.8 and a coupling coefficient of 0.7. It is to be noted that at the resonant frequency $f_0$, the phase angle curve is flat which illustrates that for variations in the vicinity of $f_0$, no phase shift occurs as does the circuit of Figure 1.

Figure 8:
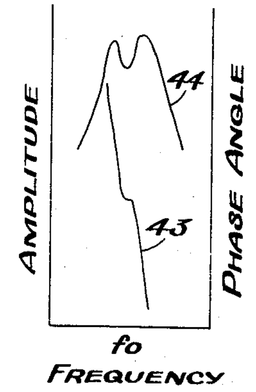
Figure 8 illustrates curves for different parameters than in Figure 7.

Figure 8 illustrates the response of the circuit in Figure 4 with different parameters than in Figure 7. Here the curve 43 represents phase angle versus frequency and the curve 44 represents voltage across the tuned circuit plotted against frequency. Q was 18.7 and the mutual coupling between $L_5$ and $L_6$ was 10.2 microhenries. It is seen that the phase angle may be held linear over a substantial range of frequencies.

The phase angle curve may be given a slope opposite to that shown in Figure 2 by varying the controlling parameters Q, coupling, and LC ratio.

It is seen that this invention allows the phase and voltage of circuits to be controlled by adding dummy tuned circuits.

Although this invention has been described with respect to particular embodiments theerof, it is not to be so limited as changes and modifications may be made therein which are within the full intended scope of the invention, as defined by the appended claims.

I claim:

1. An oscillator circuit wherein phase shift may be controlled comprising, an electron tube, a frequency stabilizing element connected to one of the electrodes of said electron tube, a first resonant circuit comprising an inductor and capacitor connected in the output circuit of said electron tube, a dummy resonant circuit comprising a second inductor and a second capacitor having a resonant frequency the same as said first resonant circuit, the second inductor mutually coupled to the first inductor, said coupling being variable thereby varying the reflective impedance, and a capacitive shield mounted between the first resonant circuit and the dummy resonant circuit for shielding them capacitively while not interfering with the magnetic coupling.

2. An oscillator circuit wherein phase shift may be controlled comprising, an electron tube, a frequency stabilizing element connected to one of the electrodes of said electron tube, a first resonant circuit comprising an inductor, a capacitor and a resistor connected in the output circuit of said electron tube, a dummy resonant circuit comprising a second inductor, a second capacitor and a second resistor, the second inductor mutually coupled to the first inductor, said coupling being variable thereby varying the reflective impedance, and a capacitive shield mounted between the first resonant circuit and the dummy resonant circuit for shielding them capacitively while not interfering with the magnetic coupling.

References Cited in the file of this patent

UNITED STATES PATENTS

| | | |
|---|---|---|
| 1,934,212 | Franklin | Nov. 7, 1933 |
| 1,934,213 | Usselman | Nov. 7, 1933 |
| 1,998,928 | Hansell | Apr. 23, 1935 |
| 2,082,472 | Tunick | June 1, 1937 |
| 2,210,384 | Rust et al. | Aug. 6, 1940 |
| 2,448,177 | Gavin et al. | Aug. 31, 1948 |
| 2,528,206 | Beveridge | Oct. 31, 1950 |
| 2,657,310 | Runft | Oct. 27, 1953 |

OTHER REFERENCES

Terman text, "Radio Engineering," 3d Ed., pp. 36–37, 356–362, 848–849. Pub. 1947 by McGraw Hill Book Co., N. Y. city.